Nov. 14, 1933.    M. KIRSCH    1,935,246

STAGING CLAMP

Filed March 26, 1931

INVENTOR
Michael Kirsch
BY
Wheeler, Wheeler & Wheeler
ATTORNEYS

Patented Nov. 14, 1933

1,935,246

UNITED STATES PATENT OFFICE 1,935,246

STAGING CLAMP

Michael Kirsch, Milwaukee, Wis.

Application March 26, 1931. Serial No. 525,402

6 Claims. (Cl. 304—40)

My invention relates to improvements in staging clamps.

The object of my invention is to provide a clamp for interengaging staging members at various angles.

More particularly stated, it is the object of my invention to provide a clamp to receive a staging member and to provide such a clamp with means for more securely holding the staging member, at the same time providing in pivotal relation with the clamp a member for securing a staging brace to the clamp at any angle.

In the drawing.

Like parts are identified by the same reference characters throughout the several views.

Figure 1:
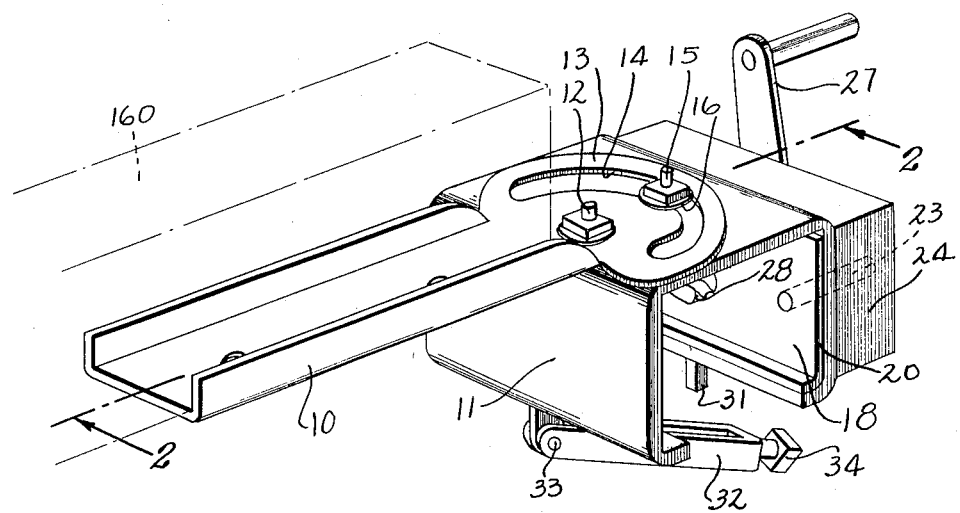
Figure 1 is a perspective of my staging clamp.

As indicated most clearly in Figure 1, my staging clamp includes two main members 10 and 11 which are in pivotal relation upon pivot bolt 12. The member 10, hereinafter referred to as the brace member, includes a semi-circular portion 13 slotted at 14 to receive an adjusting bolt 15 with washer 16, the extended portion of the member 10 being channel shaped to receive a staging brace 160 secured to the member 10 by means of wood screws 17 or other securing means. Member 11 includes a box channel 18 for the reception of a support or other main staging frame member 19. Within the channel is a clamping member 20, movable to and from the staging frame member 19, and which together with one of the sides of the channel 18 comprises the clamp. The clamp member 20 is controlled by a clamp screw 21 provided with an annular collar 22 which bears directly against the said member 20.

Guides 23 for the plate 20 extend through a side wall of the box channel 18 and into bores in a block 24, secured to the exterior of the part 11. The block 24 is threaded at 25 to receive the clamp screw 21, and a recess 26 is provided for the reception of the annular collar 22 when the clamp screw is retracted from the box channel 18. A crank 27 facilitates the rotation of the clamp screw.

For purposes of ordinary clamping action the parts thus far named would probably amply take care of any stresses imparted to a clamping device for a staging, but where excessive loads must be met at times by supporting members carried by my staging clamp I provide additional means for insuring the positive interengagement of my staging clamp with the frame support 19. Such frame supports are ordinarily of wood, and I therefore form my clamp screw with a stub drill head 28 which extends beyond the collar 22 through an aperture 29 in the material of the clamp 20. With this stub drill so disposed the rotation of the clamp screw 21 not only causes the clamp 20 to bear against the frame member 19 but also causes the drill to insert itself into the material of the frame member and form a pocket 30 positively engaging the entire clamping device with the frame member at that particular point.

As an additional safeguard to reenforce the material of which the member 11 is made, I provide a stud 31 over which a U-clamp 32, mounted for pivotal movement about pin 33, may be disposed, and a set screw 34 to bear against the stud 31 provides a reenforcement to prevent the opening up of the box channel 18.

Figure 2:
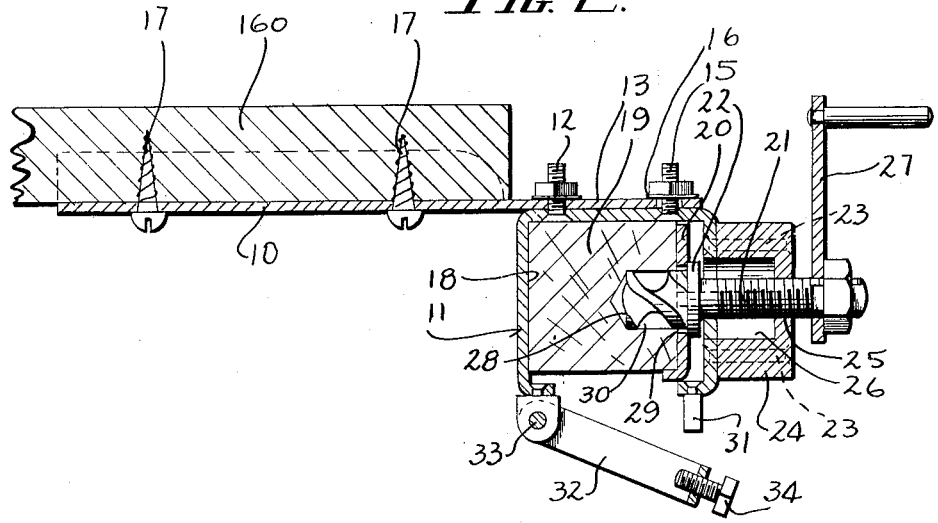
Figure 2 is a section along a median line 2—2 through the clamp and through the staging brace member.

From the above description it will be noted that a supporting frame member 19 to which my clamp is secured, as shown in Figure 2, may be braced by a bracing member 10 secured to the part 10 at virtually any angle to the frame member 19, and there can be no slipping of the clamp unless the material of the frame member 19 is actually crushed or disintegrated around the stub drill 28.

I claim:

1. A weight sustaining clamp provided with a movable weight sustaining clamp member, an actuator for the movable clamp member, and a stub drill mounted upon the actuator and extending through the clamp member.

2. A screw clamp provided with a movable clamp plate with a screw actuator therefor, and a stub drill mounted upon the end of the screw.

3. A staging clamp provided with a box channel for the reception of a staging member, a block attached to the channel, a movable apertured clamp plate in the channel and positioned to bear against the staging frame member, a screw in threaded engagement with the block and provided with a shoulder bearing against the movable clamping plate, and a stub drill connected to the screw and extending through the aperture.

4. The combination with a clamp frame adapted to receive a clamp member, of a screw and a screw actuator crank therefor in threaded engagement with the frame, a flange upon the screw to bear against the clamp member, and a stub drill forming an extension of the screw and extending through an aperture in the clamping member into the area encompassed by the frame.

5. A box channel having an apertured side wall, a recessed block registering with the aperture, an apertured clamping plate positioned in the box channel with its aperture in registry with the apertured wall of the box channel and with the recess in the block, a screw in threaded engagement with the block and provided with a shoulder and stub drill receivable in the block, the stub drill being receivable through the aperture in the clamping plate, and the shoulder being movable with the screw to bear against the margins of the aperture in the clamping plate to force the clamping plate away from the wall of the box channel.

6. The combination with a box channel and a clamping plate therein movable to and from one wall of the channel, a brace member in pivotal connection with another wall of the box channel, said brace member being provided with an arcuate slot, and an adjusting bolt extending through a wall of the channel through the slot to provide for angular adjustment of the brace member with respect to the channel member.

MICHAEL KIRSCH.